(12) United States Patent
Pasca et al.

(10) Patent No.: US 8,812,509 B1
(45) Date of Patent: Aug. 19, 2014

(54) INFERRING ATTRIBUTES FROM SEARCH QUERIES

(71) Applicant: Google Inc., Mountain View, CA (US)

(72) Inventors: Alexandru Marius Pasca, Sunnyvale, CA (US); Benjamin Van Durme, Rochester, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/667,336

(22) Filed: Nov. 2, 2012

Related U.S. Application Data

(63) Continuation of application No. 13/194,240, filed on Jul. 29, 2011, now abandoned, which is a continuation of application No. 11/750,935, filed on May 18, 2007, now Pat. No. 8,005,842.

(51) Int. Cl.
*G06F 17/30* (2006.01)

(52) U.S. Cl.
CPC .............................. *G06F 17/30864* (2013.01)
USPC ............ 707/741; 707/732; 707/737; 707/750

(58) Field of Classification Search
CPC ..................... G06F 17/30864; G06F 17/30672
USPC ............... 707/1, 10, 100, 104, 741, 706, 732, 707/737, 750, 780
See application file for complete search history.

(56) References Cited

U.S. PATENT DOCUMENTS

| | | | |
|---|---|---|---|
| 6,070,158 A | 5/2000 | Kirsch et al. | |
| 6,675,159 B1 | 1/2004 | Lin et al. | |
| 6,816,858 B1 | 11/2004 | Coden et al. | |
| 7,209,876 B2 | 4/2007 | Miller et al. | |
| 7,269,545 B2 | 9/2007 | Agichtein et al. | |
| 7,379,949 B2 | 5/2008 | Chowdhury | |
| 7,426,497 B2 | 9/2008 | Bacioiu et al. | |
| 7,467,232 B2 | 12/2008 | Fish et al. | |
| 7,519,529 B1 | 4/2009 | Horvitz | |
| 7,555,475 B2 * | 6/2009 | Quiroga et al. | 707/999.003 |
| 7,624,007 B2 | 11/2009 | Bennett | |
| 7,730,060 B2 | 6/2010 | Chakrabarti et al. | |
| 7,792,858 B2 | 9/2010 | Tang et al. | |
| 7,865,495 B1 | 1/2011 | Roizen et al. | |
| 8,005,842 B1 | 8/2011 | Pasca et al. | |
| 8,069,182 B2 * | 11/2011 | Pieper | 707/769 |
| 8,375,048 B1 * | 2/2013 | Wad et al. | 707/767 |

(Continued)

FOREIGN PATENT DOCUMENTS

WO     WO 01/19160     3/2001

OTHER PUBLICATIONS

A. Hogue and D. Karger, "Thresher: automating the unwrapping of semantic content from the World Wide Web," Proc. of WWW, pp. 86-95 (2005).

(Continued)

*Primary Examiner* — Jay Morrison
*Assistant Examiner* — Dangelino Gortayo
(74) *Attorney, Agent, or Firm* — Fish & Richardson P.C.

(57) ABSTRACT

Systems, techniques, and machine-readable instructions for inferring attributes from search queries. In one aspect, a method includes receiving a description of a collection of search queries, inferring attributes of entities from the description of the collection of search queries, associating the inferred attributes with identifiers of entities characterized by the attributes, and making the associations of the attributes and entities available.

18 Claims, 8 Drawing Sheets

(56) References Cited

U.S. PATENT DOCUMENTS

| | | | |
|---|---|---|---|
| 2006/0004850 | A1 | 1/2006 | Chowdhury |
| 2007/0078850 | A1 | 4/2007 | Aziz et al. |
| 2007/0203891 | A1 | 8/2007 | Solaro et al. |
| 2007/0276845 | A1 | 11/2007 | Geilich |
| 2008/0228675 | A1 | 9/2008 | Duffy et al. |

OTHER PUBLICATIONS

A. Kupsc, T. Mitamura, B. Van Durme and E. Nyberg. 2004. "Pronominal Anaphora Resolution for Unrestricted Text." *Session 031-EW, Coreference, Anaphora & Evaluation (II)*. LREC, May 24-30, 2004. Lisbon, Portugal.
A. Sugiura and Y. Koseki, "Internet Scrapbook: automating Web browsing tasks by demonstration," Proc. of UIST, pp. 9-18 (1998).
A. Y. Halevy, A. Rajaraman, and J. J. Ordille. "Data integration: The teenage years," Proc. of VLDB, pp. 9-16 (2006).
B. Amento, L. Terveen, and W. Hill, Experiments in social data mining: The TopicShop system. ACM Trans. on Computer-Human Interaction, pp. 54-85 (2003).
D. Huynh, S. Mazzocchi, and D. Karger, "Piggy Bank: Experience the semantic web inside your Web browser," Proc. of ISWC, pp. 413-430 (2005).
D. Lin and P. Pantel. 2002. "Concept Discovery from Text." Department of Computing Science, University of Alberta. pp. 1-7. Edmonton, Alberta, Canda. COLING 2002.
D. Moldovan, M. Pasca, S. Harabagiu and M. Surdeanu. 2003. "Performance Issues and Error Analysis in an Open-Domain Question Answering System." ACM Transactions on Information Systems, vol. 21, No. 2, Apr. 2003, pp. 133-154.
D. Moldovan, S. Harabagiu, M. Pasca, R. Mihalcea, R. Girju, R. Goodrum and V. Rus. 2000. "The Structure and Performance of an Open-Domain Question Answering System." *In Proceedings of the Conference of the Association for Computational Linguistics (ACL-2000)*, 563-570. Available online at: http://citeseer.ist.psu.edu/moldovan00structure.html.
D. Moldovan, S. Harabagiu, M. Pasca, R. Mihalcea, R. Goodrum, R. G irji, and V. Rus. 1999. "LASSO: A Tool for Surfing the Answer Net." In *Proceedings of the Eighth Text Retrieval Conference (TREC-8)*, 1999.
D.R. Dowty, R.E. Wall, and S. Peters. 1981. "Introduction to Montague Semantics." Kluwer Academic Publishers, Dordrecht, The Netherlands.
Dontcheva, M., Drucker, S., Salesin, D., Cohen, M., "Relations, Cards, and Search Templates: User-Guided Data Integration and Layout," UIST '07, pp. 61-70 (Oct. 7-10, 2007).
E. Agichtein and L. Gravano. 2000. "*Snowball*: Extracting Relations from Large Plain-Text Collections." ACM DL 2000.
E. Voorhees and D. Tice. 2000. "Building a Question Answering Test Collection." In *Proceedings of the Twenty-Third Annual International ACM SIGIR Conference on Research and Development in Information Retrieval*, Athens, Greece. Available online at http://citeseer.ist.psu.edu/348958.html.
E. Voorhees. 2003. "Evaluating Answers to Definition Questions." In *Proceedings of the conference on Human Language Technology and Empirical Methods in Natural Language Processing*, Vancouver, British Columbia, Canada.
G. Robertson, M. Czerwinski, K. Larson, D. Robbins, D. Thiel, and M. van Dantzich, "Data mountain: using spatial memory for document management," Proc. of UIST, pp. 153-162 (1998).
Gentner, D., "Some Interesting Differences Between Verbs and Nouns," *Cognition and Brain Theory* (1981), No. 2, Lawrence Erlbaum Associates, Hillsdale, New Jersey, p. 161-178.
Hanson, S.J., et al., "Conceptual Clustering, Categorization, and Polymorphy," *Machine Learning* (1988), vol. 3, Kluwer Academic Publishers, The Netherlands, p. 343-372.
I. Ounis and M. Pasca. 1997 IEEE. "An Extended Inverted File Approach for Information Retrieval." *Proceedings of the 1997 International Symposium on Database Engineering & Applications*. pp. 397-402.

I. Ounis and M. Pasca. 1998. "A Promising Retrieval Algorithm for Systems based on the Conceptual Graphs Formalism." *Proceedings of the 1998 International Symposium on Database Engineering & Applications*. IDEAS 1998.
I. Ounis and M. Pasca. 1998. "Modeling, Indexing and Retrieving Images Using Conceptual Graphs." *Proceedings of the 9th International Conference on Database and Expert Systems Applications*. Springer-Verlag, London, UK. pp. 226-239.
I. Ounis and M. Pasca. 1998. "Relief: Combining expressiveness and rapidity into a single system." *Proceedings of the 21st Annual International ACM SIGIR Conference on Research and Development in Information Retrieval*, Aug. 24-28, 1998, Melbourne, Australia. SIGIR '98, pp. 266-274.
I. Ounis and M. Pasca. 1999 IEEE. "The Relief Retrieval System." Proceedings of *1997 IEEE Knowledge and Data Engineering Exchange Workshop*. Grenoble Cedex France.
J. Madhavan, S. Cohen, X. L. Dong, A. Y. Halevy, S. R. Jeffery, D. Ko, and C. Yu, "Web-scale data integration: You can afford to pay as you go," Proc. of CIDR, pp. 342-350 (2007).
K. Shinzato and K. Torisawa. 2004. "Acquiring Hyponymy Relations from Web Documents." School of Information Science, Japan Advanced Institute of Science and Technology (JAIST). Tatsunokuchi, Nomi-gun, Ishikawa, Japan. HLT-NAACL 2004.
K. Tokunaga, et al., "Automatic Discovery of Attribute Words from Web Documents," *R. Dale et al. (Eds.): IJCNLP 2005, LNAI 3651*, pp. 106-118, 2005, Springer-Verlag, Berlin, Heidelberg 2005.
K. Tokunaga, J. Kazama, and K. Torisawa. 2005. "Automatic Discovery of Attribute Words from Web Documents." IJCNLP 2005. Japan Advanced Institute of Science and Technology (JAIST). Nomi, Ishikawa, Japan.
L. Lita and J. Carbonell. 2004. "Instance-Based Question Answering: A Data-Drive Approach." In *Proceedings of the 42$^{nd}$ Annual Meeting of the Association for Computational Linguistics*. (ACL 2004), Jul. 21-26, Barcelona, Spain.
L. Schubert. 2002. "Can We Derive General World Knowledge from Texts?" *Human Language Technology*, 2002, Mar. 24-27, San Diego, CA, HLT 2002 Conference Notebook, pp. 84-87.
Liddy, E.D., et al., "A Natural Language Text Retrieval System with Relevance Feedback," *16$^{th}$ National Online Meeting Proceedings* (1995), Learned Information, Inc., Medford, NJ, p. 259-261.
Liddy, E.D., et al., "An Overview of DR-LINK and Its Approach to Document Filtering," *Human Language Technology*, Proceedings of a workshop held at Plainsboro, New Jersey Mar. 21-24, 1993, Advanced Research Projects Agency, p. 358-362.
Liddy, E.D., et al., "DR-LINK System: Phase I Summary," *Tipster Text Program, Phase I*, Proceedings of a Workshoip held at Fredricksburg, Virginia, Sep. 19-23, 1993, Advanced Research Projects Agency, p. 93-112.
Liddy, E.D., et al., "DR-LINK: Document Retrieval Using Linguistic Knowledge," *Human Language Technology*, Proceedings of a workshop held at Plainsboro, New Jersey Mar. 21-24, 1993, Advanced Research Projects Agency, p. 416.
Liddy, E.D., et al., "Text Categorization for Multiple Users Based on Semantic Features from a Machine-Readable Dictionary," *acm Transactions on Information Systems* (1994), vol. 12, No. 3, Association for Computing Machinery, Inc., New York, NY, p. 278-295.
M. Berland, E. Charniak, "*Finding Parts in Very Large Corpora*," Department of Computer Science, Brown University, Box 1910, Providence, RI 02912, Proceedings of the ACL 1999, pp. 57-64 (1999).
M. Craven, D. DiPasquo, D. Freitag, A. McCallum, T. Mitchell, K. Nigam and S. Slattery. 2000. "Learning to Construct Knowledge Bases from the World Wide Web." *Artificial Intelligence*, vol. 118, Apr. 2000. Available online at http://citeseer.ist.psu.edu/craven00learning.html.
M. Dontcheva, S. M. Drucker, G.Wade, D. Salesin, and M. F. Cohen, "Summarizing personalWeb browsing sessions," Proc. of UIST, pp. 115-124 (2006).
M. Fleischman, E. Hovy, A. Echihabi, "*Offline Strategies for Online Question Answering: Answering Questions before They are Asked*," USC Information Sciences Institute, Marina del Ray, CA, 90292-6695, Proc. ACL '03, pp. 1-7 (2003).

(56) References Cited

OTHER PUBLICATIONS

M. Maybury. 2004. "New Directions in Question Answering." AAAI Press and Cambridge, MA: The MIT Press. pp. 413-417.

M. Pasca and P. Dienes. 2005. "Aligning Needles in a Haystack: Paraphrase Acquisition Across the Web." R. Dale et al. (Eds.): IJCNLP 2005, LNAI 3651, pp. 119-130. Springer-Verlag Berlin Heidelberg.

M. Pasca and S. Harabagiu. 2001. "Answer Mining from On-line Documents." *39th Annual Meeting of the Association for Computational Linguistics* (ACL-2001), Workshop on Open-Domain Question Answering, Jul. 2001, Toulouse, France.

M. Pasca and S. Harabagiu. SIGIR 2001. "High Performance Question/Answering." *Proceedings of the 24th annual international ACM SIGIR conference on Research and development in information retrieval table of contents*, New Orleans, Louisiana. pp. 366-374.

M. Pasca, D. Lin, J. Bigham, A. Lifchits and A. Jain. 2006. "Names and Similarities on the Web: Fact Extraction in the Fast Lane." *Proceedings of the 21st International Conference on Computational Linguistics and 44th Annual Meeting of ACL*, Sydney, Jul. 2006. pp. 809-816.

M. Pasca, D. Lin, J. Bigham, A. Lifchits, and A. Jain. 2006. "Organizing and Searching the World Wide Web of Facts—Step One: the One-Million Fact Extraction Challenge." In *Proceedings of the 21st National Conference on Artificial Intelligence (AAAI-06)*. pp. 1400-1405.

M. Pasca. 2001. "Unveiling Next Generation Search Technologies: Answer Extraction on the Web." *2nd International Conference on Internet Computing (IC-2001)*, Jun. 2001, Las Vegas, Nevada.

M. Pasca. 2002. "Answer Finding Guided by Question Semantic Constraints." In *Proceedings of the Fifteenth International Florida Artificial Intelligence Research Society Conference*, May 14-16, 2002. Pensacola Beach, Florida.

M. Pasca. 2002. "Processing Definition Questions in an Open-Domain Question Answering System." Supplied by The British Library—"The world's knowledge." AAAI-2002.

M. Pasca. 2003. "Question-Driven Semantic Filters for Answer Retrieval." *International Journal of Pattern Recognition and Artificial Intelligence*. vol. 17, No. 5 (2003) 741-756. World Scientific Publishing Company.

M. Pasca. 2005. "Mining Paraphrases from Self-anchored Web Sentence Fragments." A. Jorge et al. (Eds.): PKDD 2005, LNAI 3721, pp. 193-204. Springer-Verlag Berlin Heidelberg.

M. Pasca. CICLing 2005. "Finding Instance Names and Alternative Glosses on the Web: WordNet Reloaded." A. Gelbukh (Ed.): CICLing 2005, LNCS 3406, pp. 280-292. Springer-Verlag Berlin Heidelberg.

M. Pasca. CIKM 2004. "Acquisition of Categorized Named Entities for Web Search." In *Proceedings of the thirteenth ACM international conference on Information and knowledge management*. Washington, D.C. pp. 137-145.

M. Pignataro, M. Pasca, and P. Franchin. 2000. "Post-buckling analysis of corrugated panels in the presence of multiple interacting modes." Thin Walled Structures, Elsevier Science Ltd., vol. 36, pp. 47-66.

M. Schraefel, Y. Zhu, D. Modjeska, D. Wigdor, and S. Zhao, "Hunter Gatherer: interaction support for the creation and management of within-web-page collections," Proc. of WWW, pp. 172-181 (2002).

M. Yoshida, K. Torisawa, J. Tsujii, "*Extracting Attributes and Their Values from Web Pages*," Chapter 10 in "Web Document Analysis; Challenges and Opportunities," (A. Antonacopoulos ed.) World Scientific Publishing Co. Pte. Ltd., pp. 179-200 Singapore (2003).

M. Yoshida, "*Extracting Attributes and Their Values from Web Pages*," Proc. ACL Student Research Workshop, Philadelphia, pp. 72-77 (Jul. 2002).

M.J. Cafarella, D. Downey, S. Soderland, and O. Etzioni. 2005. "KnowItNow: Fast, Scalable Information Extraction from the Web." *Proceedings of Human Language Technology Conference on Empirical Methods in Natural Language Processing (HLT/EMNLP)*, pp. 563-570, Vancouver, Oct. 2005.

P. Pantel and D. Ravichandran. 2004. "Automatically Labeling Semantic Classes." In *Proceedings of Human Language Technology / North American Association for Computational Linguistics* (HLT/NAACL-04). Boston, MA. Available online at http://www.isi.edu/~pantel/demos.htm.

P. Turney. 2001. "Mining the Web for Synonyms: PMI-IR versus LSA on TOEFL." *Proceedings Proceedings of the Twelfth European Conference on Machine Learning (ECML-2001)*, Freiburg, Germany. pp. 1-12.

P. Viola and M. Narasimhan, "Learning to extract information from semi-structured text using a discriminative context free grammar," Proc. of SIGIR, pp. 330-337 (2005).

Paik, W., et al., "Categorizing and Standardizing Proper Nouns for Efficient Information Retrieval," *Acquisition of Lexical Knowledge from Text, Proceedings of a Workshop Sponsored by the Special Interest Group on the Lexicon of the Association for Computational Linguistics*, Jun. 21, (1993), Columbus, OH, Association for Computational Linguistics, p. 154-160.

Paik, W., et al., "Interpretation of Proper Nouns for Information Retrieval," *Acquisition of Lexical Knowledge from Text, Proceedings of a Workshop Sponsored by the Special Interest Group on the Lexicon of the Association for Computational Linguistics*, Jun. 21, (1993), Columbus, OH, Association for Computational Linguistics, p. 309-313.

R. Bunescu and M. Pasca. 2006. "Using Encyclopedic Knowledge for Named Entity Disambiguation." *Proceedings of the 11th Conference of the European Chapter of the Association for Computational Linguistics (EACL-06)*, Trento, Italy 9-16 (2006). pp. 9-16.

S. Card, G. Roberston, and W. York, "The WebBook and the Web Forager: An information workspace for the World-Wide Web," Proc. of SIGCHI, pp. 111-117 (1996).

S. Harabagiu and M. Pasca. 1999. "Integrating Symbolic and Statistical Methods for Prepositional Phrase Attachment." In *Proceedings of the Twelfth International Florida AI Research Society Conference*. Orlando, Florida May 3-5, 1999. AAAI Press. National Language Processing.

S. Harabagiu and M. Pasca. 2000. "Mining Textual Answers with Knowledge-Based Indicators." In *Proceedings of FLAIRS-2000*, May 2000, Orlando FL, pp. 214-218.

S. Harabagiu, D. Moldovan, M. Pasca, M. Surdeanu, R. Mihalcea, R. Girju, V. Rus, F. Lacatusu, P. Morarescu and R. Bunescu. 2001. "Answering complex, list and context questions with LCC's Question-Answering Server." In *Proceedings of the Tenth Text Retrieval Conference (TREC-10)*, Gaithersburg, Maryland, Nov. 13-16, 2001.

S. Harabagiu, D. Moldovan, M. Pasca, R. Mihalcea, M. Surdeanu, R. Bunescu, R. Girju, V. Rus, and P. Morarescu. 2000. "FALCON: Boosting Knowledge for Answer Engines." In the *Proceedings of Text Retrieval Conference (TREC-9)*, 2000. Gaithersburg, Maryland.

S. Harabagiu, D. Moldovan, M. Pasca, R. Mihalcea, M. Surdeanu, R. Bunescu, R. Girju, V. Rus, and P. Morarescu. 2001. "The Role of Lexico-Semantic Feedback in Open-Domain Textual Question-Answering." *Proceedings of the 39th Annual Meeting on Association for Computational Linguistics, Toulouse, France*. pp. 282-289.

S. Harabagiu, M. Pasca and S. Maiorano. 2000. "Experiments with Open-Domain Textual Question Answering." In *Proceedings of the COLING-2000, Association for Computational Linguistics/Morgan Kaufmann*, Aug. 2000. Saarbruken, Germany.

S. Harabagiu, M. Pasca and S. Maiorano. 2001. "A Knowledge-Based Answer Engine for Open-Domain Questions." International Journal on Artificial Intelligence Tools, vol. 10, Nos. 1&2, 199-224. World Scientific Publishing Company.

S. Harabagiu, M. Pasca and V. Lacatusu. 2001. "Dialogue Management for Interactive Question Answering." In *Proceedings of the Fourteenth International Florida Artificial Intelligence Research Society Conference*, Key West, Florida.

S. Harabagiu, S. Moaiorano and M. Pasca. 2003. "Open-domain textual question answering techniques." National Language Engineering 9 (3): 231-267. Cambridge University Press.

S. Ye, T.-S. Chua, J. Kei, "Querying and Clustering Web Pages about Persons and Organizations," Proceedings of the IEEE/WIC International Conference on Web Intelligence (WI'03) (2003).

(56) References Cited

OTHER PUBLICATIONS

Salton, G., "Automatic Text Processing, The Transformation, Analysis, and Retrieval of Information by Computer," Addison-Wesley Publishing Company (1989), Table of Contents, p. ix-xiii.

T. Chklovski. Feb. 2003. "Using Analogy to Acquire Commonsense Knowledge from Human Contributors." MIT Artificial Intelligence Laboratory Technical Report AITR-2003-002. pp. 1-200. Available online at URL:ftp://publications.ai.mit.edu/ai-publications/2003/AITR-2003-002.pdf.

T. Hasegawa, S. Sekine and R. Grishman. 2004. "Discovering Relations among Named Entities from Large Corpora." *Proceedings of the 42nd Annual Meeting of the Association for Computational Linguistics*, Jul. 21-26, 2004, Barcelona, Spain.

T. Kristjansson, A. Culotta, P. Viola, and A. McCallum, "Interactive information extraction with constrained conditional random fields," Proc. of AAAI, pp. 412-418 (2004).

Tokunaga et al., "Automatic Discovery of Attribute Words from Web Documents," Springer-Berlin Heidelberg (2005).

U. Irmak and T. Suel, "Interactive wrapper generation with minimal user effort," Proc. of WWW, pp. 553-563 (2006).

Van Dijk, T.A., "News Analysis, Case Studies of International and National News in the Press," Lawrence Erlbaum Associates (1988), Hillsdale, NJ, Table of Contents, p. v-vii.

Y. Chiaramella, P. Mulhern, M. Mechkour, I. Ounis, M. Pasca. 1998. "Towards a Fast Precision-Oriented Image Retrieval System." *Proceedings of the 21st Annual International ACM SIGIR Conference on Research and Development in Information Retrieval*, Aug. 24-28, 1998, Melbourne, Australia. SIGR '98.

\* cited by examiner

INFERRING ATTRIBUTES FROM SEARCH QUERIES

CROSS-REFERENCE TO RELATED APPLICATIONS

This application is a continuation application and claims the priority of U.S. application Ser. No. 13/194,240, filed Jul. 29, 2011 and entitled "Inferring Attributes from Search Queries," which is a continuation application of and claims the priority of U.S. application Ser. No. 11/750,935, filed May 18, 2007 and entitled "INFERRING ATTRIBUTES FROM SEARCH QUERIES," both contents of which are incorporated herein by reference.

BACKGROUND

This disclosure relates to inferring attributes from search queries.

An attribute is a property, feature, or characteristic of an entity. For example, individuals have a name, a height, and a weight, a city has a geographic location, a mayor, and a population, and a product can have model name and a year. Since there are many different entities and entities can have a wide variety of attributes, enumerating the attributes of an entity can be a daunting task.

SUMMARY

This specification describes technologies relating to analysis of search queries to infer attributes of different entities. In general, in one aspect, a method includes receiving a description of a collection of search queries, inferring attributes of entities from the description of the collection of search queries, associating the inferred attributes with identifiers of entities characterized by the attributes, and making the associations of the attributes and entities available.

This and other aspects can include one or more of the following features. The attributes inferred from the description of the collection of search queries can be refined. For example, the attributes can be refined by identifying proper name attributes and discarding the proper name attributes. As another example, the attributes can be refined by identifying generic attributes and discarding the generic attributes. As another example, the attributes can be refined by identifying semantically-related attributes and combining a number count of the semantically-related attributes. As another example, the attributes can be refined by discarding entities that characterize undesirable entities.

The entities for which attributes are inferred can be instances. The inferred attributes can be associated with identifiers by associating the inferred attributes with identifiers of categories to which the instances belong. The inferred attributes can be associated with identifiers by representing a system of entities using the inferred attributes. The description of the collection of search queries can include a log of search queries. The inferred attributes can be associated with identifiers by weighting the inferred attributes and scoring the inferred attributes based, at least in part, on the weighting.

In another aspect, an article includes one or more machine-readable media storing instructions operable to cause one or more data processing devices to perform operations. The operations can include receiving a collection of search queries, examining the search queries to identify instance entities and attributes that characterize the instance entities, associating the attributes of the instance entities with categories to which the instance entities belong, and making the associations of the attributes and the categories available.

This and other aspects can include one or more of the following features. The operations can include refining the identified instance entities and attributes. For example, a number of instance entities and attributes can be reduced. As another example, the instance entities and attributes can be refined by identifying proper name attributes and generic attributes and discarding the proper name attributes and the generic attributes.

The operations can include scoring the attributes associated with a category. For example, the attributes can be weighted based on a parsing of the search query or a weighting of the attributes can be smoothed to avoid over-emphasis of rare attributes. The attributes can be associated with categories by storing identifiers of the attributes in association with identifiers of the categories and/or by comparing the identified instance entities to definitions of the categories. Examining the search queries can include inferring the instance entities and the attributes using an extract pattern.

Particular implementations of the subject matter described in this specification can realize one or more of the following advantages. The search queries formulated by a set of diverse users can be used to identify attributes of entities, along with the relative importance of those attributes. This can be done automatically, without bias from a human user who is overseeing the identification of attributes.

The details of one or more implementations are set forth in the accompanying drawings and the description below. Other features, aspects, and advantages will be apparent from the description and drawings, and from the claims.

BRIEF DESCRIPTION OF DRAWINGS

Like reference symbols in the various drawings indicate like elements.

DETAILED DESCRIPTION

Figure 1:
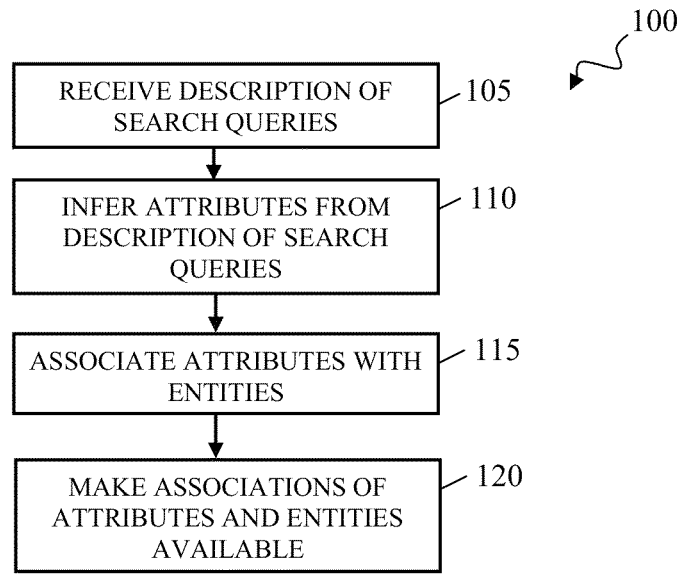
FIGS. 1, 6, 9 are flowcharts of processes for inferring attributes of entities from search queries.

FIG. 1 is a flowchart of a process 100 for inferring attributes of entities from search queries. Process 100 can be performed by a system of one or more data processing devices performing operations in accordance with the logic of a set of machine-readable instructions. For example, process 100 can be performed by a computer that runs software.

The system performing process 100 receives a description of a collection of search queries (105). A search query is a collection of one or more constraints that identify a subset of a larger collection of information for retrieval. For example, a search query can include a string of text that is provided to a search engine by a human user for searching the Internet for resources that are related to the text in the search query.

Figure 2:
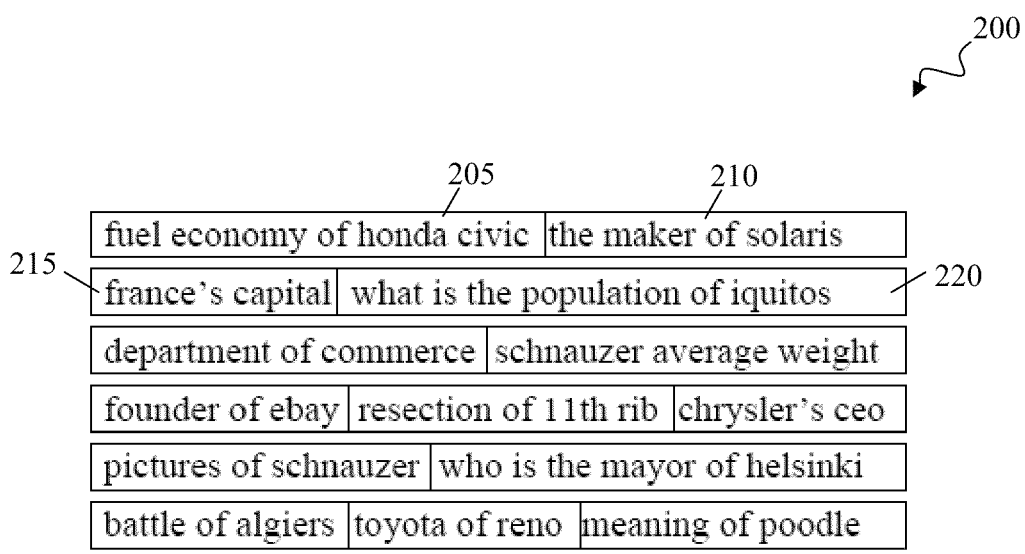
FIG. 2 shows a search query log.

The search queries can be described in a number of ways. For example, the description can include a redaction or other summary of a collection of search queries. As another example, a list of search queries in a collection and a number count identifying the number of times that the search queries appear in the collection can be received. FIG. 2 shows yet another example of a description of a collection of search queries, namely, a search query log 200. Search query log 200 is a record of strings of text 205, 210, 215, 220 that a human user has provided to a search engine for searching the Internet.

Returning to FIG. 1, the system performing process 100 infers entity attributes from the description of the search queries (110). Attributes can be inferred by identifying entities, attributes, and relationships between the entities and attributes in the described search queries. For example, language or other text in search queries can be examined to identify entities, attributes, and their associations. As discussed further below, the entities characterized by the inferred attributes can be instances or categories of instances.

Figure 3:
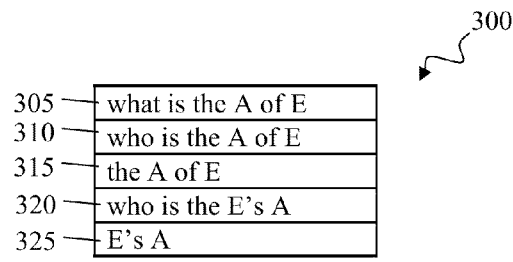
FIG. 3 is a schematic representation of a collection of linguistic patterns that can be used to infer entity attributes.

FIG. 3 is a schematic representation of a collection 300 of linguistic patterns that can be used to infer entity attributes from a description of search queries. In particular, collection 300 includes extract patterns 305, 310, 315, 320, 325, 330 that can be used to identify entities, attributes, and relationships between the entities and attributes in a log of search queries, such as search query log 200 (FIG. 2).

Extract pattern 305 can be used to scan keyword-based queries for text that matches the format "what is the <attribute> of <entity>." Examples of such text includes "what is the capital of Brazil" and "what is the airspeed velocity of an unladen swallow." Extract pattern 310 can be used to scan keyword-based queries for text that matches the format "who is the <attribute> of <entity>." Examples of such text includes "who is the mayor of Chicago" and "who is the CEO of Google."

Extract pattern 315 can be used to scan keyword-based queries for text that matches the format "the <attribute> of <entity>." Examples of such text includes "the capital of France" and "the manager of the Yankees." Extract pattern 320 can be used to scan keyword-based queries for text that matches the format "who is the <entity>'s <attribute>." Examples of such text includes "who is the Yankees' manager" and "who is the airplane's pilot." Extract pattern 325 can be used to scan keyword-based queries for text that matches the format "<entity>'s<attribute>." Examples of such text includes "Rosemary's baby" and "Michelangelo's David."

A subset of the extract patterns in collection 300 can be used to infer entity attributes from a description of search queries. Moreover, collection 300 is not an exhaustive list of extract patterns. For example, other extract patterns, extract patterns in different tenses (e.g., "what was the <attribute> of <entity>" or "who will be the <attribute> of <entity>"), and extract patterns with different numbers (e.g., "what are the <attributes> of <entity>" and "who are the <attributes> of <entity>") can also be used.

Returning to FIG. 1, the system performing process 100 associates the entity attributes with the entities for which the entity attribute is a property, feature, or characteristic (115). Such associations can be embodied in a representation of the entities in the logic of a set of data processing activities. For example, the entities can be represented in data that characterizes the attributes of the entities. As another example, the entities can be represented in one or more discrete data structures that include information describing associated attributes and embodies the association between entities and attributes.

Figure 4:
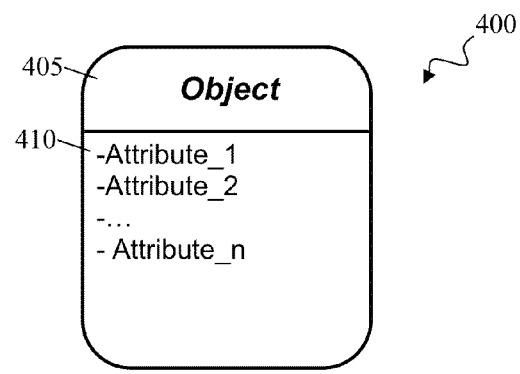
FIG. 4 is an example of a data object that represents an entity using attributes of the entity.

FIG. 4 is an example of a data object 400 that represents an entity using attributes of the entity. Data object 400 can represent an instance (e.g., France, Atlanta, Warhol) and/or a category of instances (e.g., companies, countries, opiates). In some implementations, multiple data objects can be used to define a system of entities using relations between entities, attribute inheritance, and the like.

The representation of an entity by data object 400 can include an object name 405 and a collection of entity attributes 410. Object name 405 is the name of the entity represented by object 400. Attribute collection 410 includes attributes that are properties, features, or characteristics of the entity represented by object 400. In some implementations, entity attributes in collection 410 can have associated values that further define the entity. For example, an object class 400 that represents left-handed relief pitchers can have the value "left-handed" associated with a handedness attribute in collection 410.

Figure 5:
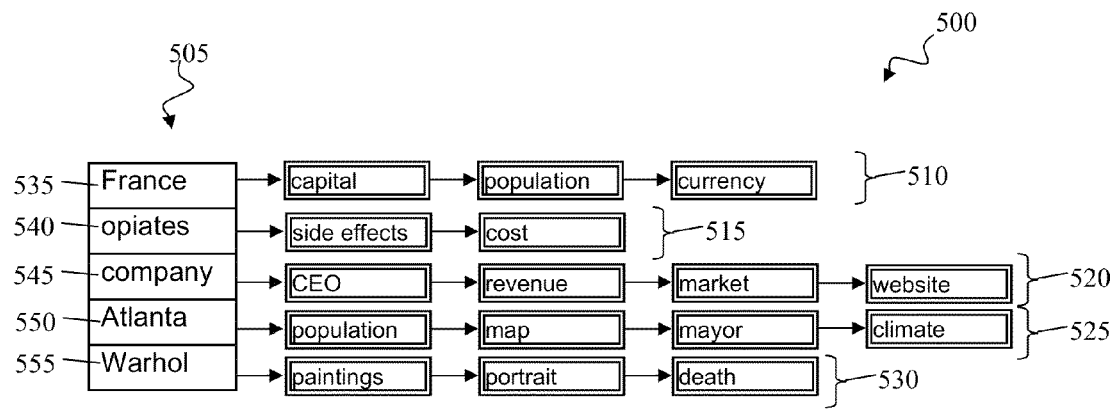
FIG. 5 is an example of a data structure that embodies the association of entity attributes with entities characterized by the attributes.

FIG. 5 is an example of a data structure 500 that embodies the association of entity attributes with entities characterized by the attributes. Data structure 500 includes a data table 505 and a collection of linked lists 510, 515, 520, 525, 530.

Data table 505 includes a collection of entries 535, 540, 545, 550, 555. Entries 535, 540, 545, 550, 555 each include an identifier of an entity along with a pointer to an associated linked list 510, 515, 520, 525, 530. In particular, entry 535 includes an identifier of the entity "France" along with a pointer to linked list 510, entry 540 includes an identifier of the entity "opiates" along with a pointer to linked list 515, entry 545 includes an identifier of the entity "company" along with a pointer to linked list 520, entry 550 includes an identifier of the entity "Atlanta" along with a pointer to linked list 525, and entry 555 includes an identifier of the entity "Warhol" along with a pointer to linked list 530. The entities identified in entries 535, 540, 545, 550, 555 can be instances (e.g., France, Atlanta, Warhol) and/or categories of instances (e.g., companies, teams, opiates). The identifiers in entries 535, 540, 545, 550, 555 can be a name, a numeric or other identifier associated with the entity, a hash value, or the like.

Linked lists 510, 515, 520, 525, 530 each include a collection of entity attributes that are a property, feature, or characteristic of the entities identified in entries 535, 540, 545, 550, 555 of data table 505. For example, linked list 510 includes the entity attributes "capital," "population," and "currency" that are associated with the entity "France" by virtue of the pointer from entry 535. As another example, linked list 515 includes the entity attributes "side effects" and "cost" that are associated with the entity "opiates" by virtue of the pointer from entry 540.

In some implementations, entity attributes in linked lists 510, 515, 520, 525, 530 can have associated values that further define the entity. For example, the entity attribute "currency" in linked list 510 can be associated with the value "Euro."

Returning to FIG. 1, the system performing process 100 makes the associations of entity attributes and entities available (120). The associations can be made available to a human user and/or to one or more sets of data processing activities performed in accordance with the logic of machine-readable instructions. For example, the associations can be output on a display. As another example, access to a data structure that embodies the association of entity attributes with entities can be granted to a set of data processing activities.

In some implementations, the associations of entity attributes and entities can be made available for associating values with the entity attributes. For example, the values can be identified using answer extraction systems and techniques.

In some implementations, the associations of entity attributes and entities, along with values associated with entity attributes, can be made available to a search engine or an allied set of data processing activities. In response to receipt of a search query that names an entity, the search engine can augment a set of responsive search results with a compilation of facts regarding the named entity. The facts can be based on the values associated with attributes associated with the entity named in the search query.

Moreover, in some implementations, the associations of entity attributes and entities can be made available to a search engine or allied set of data processing activities for identifying keyword-based queries that request factual information. For example, queries that include both an entity and an attribute of that entity (e.g., "altitude Helsinki" or "capital Peru") can by identified as requests for factual information by comparing the queries to associations of entity attributes and entities. Moreover, in some implementations, values that are associated with entity attributes can be used to generate a factual response to such queries.

Figure 6:
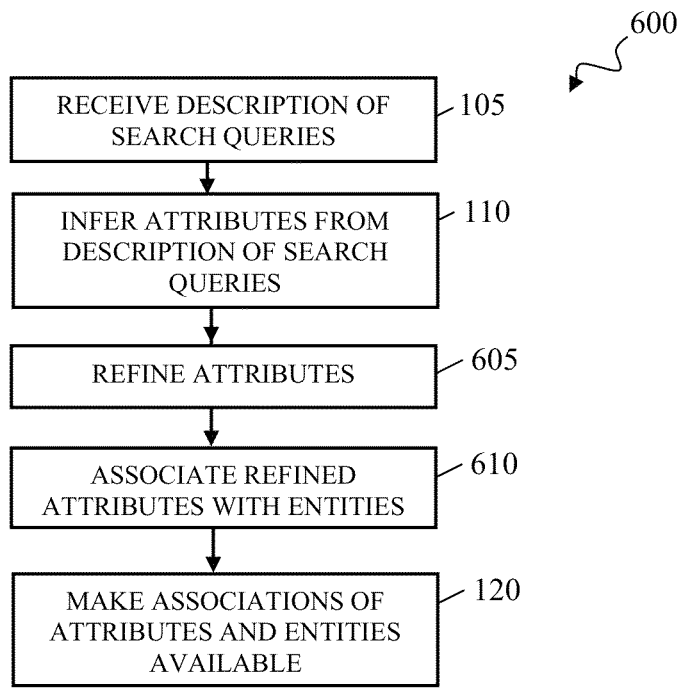

FIG. 6 is a flowchart of a process 600 for inferring attributes of entities from search queries. Process 600 can be performed by a system of one or more data processing devices performing operations in accordance with the logic of a set of machine-readable instructions.

In addition to receiving a description of search queries (105) and inferring entity attributes from the description of search queries (110), the system performing process 600 refines the entity attributes inferred from the description of search queries (605).

Refining the entity attributes can generally improve the quality of the entity attributes for a selected purpose. For example, refining entity attributes can improve the precision of the entity attributes, as discussed further below. Improved precision can be useful in, e.g., augmenting a set of responsive search results with a compilation of facts regarding an entity named in the search query, identifying keyword-based queries that request factual information, and generating factual response to such keyword-based queries. Such improvements in quality can result from a reduction in the number of entity attributes by, e.g., eliminating undesirable attributes and/or merging related attributes.

The system performing process 600 associates the refined entity attributes with entities (610). Such associations can be embodied in a representation of the entities in the logic of a set of data processing activities. The associations of the entity attributes and entities can be made available (120).

Figure 7:
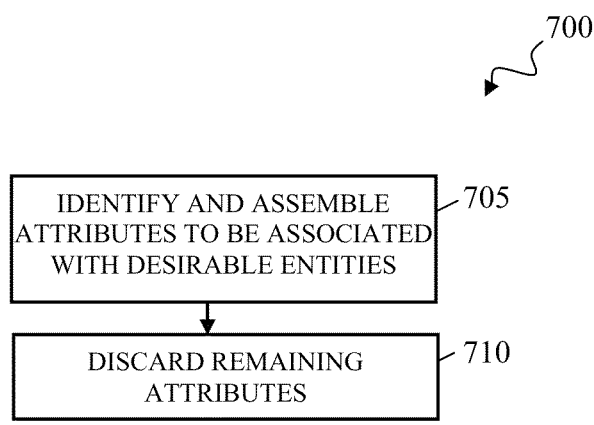
FIGS. 7, 8 are flowcharts of processes for refining a collection of attributes.

FIG. 7 is a flowchart of a process 700 for refining a collection of attributes. Process 700 can be performed in isolation or in conjunction with one or more other processes. For example, process 700 can be performed (605) in process 600 (FIG. 6) by the same system that performs process 600 or by an allied system.

The system performing process 700 identifies and assembles attributes that are to be associated with desirable entities (705). For example, the system can receive a list or other collection of desirable entities and then determine which attributes in the collection are to be associated with listed entities. As another example, the system can apply a rule or other logic to determine which attributes are to be associated with desirable entities.

The system performing process 700 discards any remaining attributes (710). For example, the discarded attributes can be deleted from memory or otherwise omitted from further processing of attributes.

Figure 8:
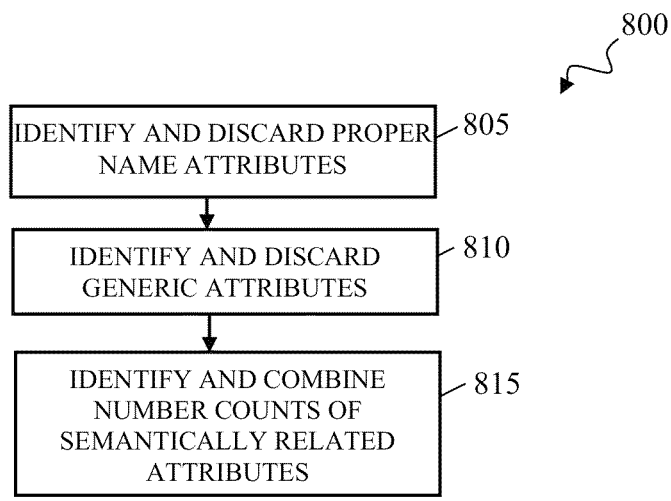

FIG. 8 is a flowchart of a process 800 for refining a collection of attributes. Process 800 can be performed in isolation or in conjunction with one or more other processes. For example, process 800 can be performed (605) in process 600 (FIG. 6), alone or in conjunction with process 700, by the same system or by an allied system.

The system performing process 800 identifies and discards proper name attributes (805). Proper names denote particular people, places, or things. In English, proper names are properly capitalized. Proper name attributes are identified as attributes using extract patterns or other approaches but are proper names or parts of proper names. For example, the extract pattern "the <attribute> of <entity>" identifies "battle" as an attribute of "Midway" in the phrase "the Battle of Midway." As another example, the extract pattern "what is the <attribute> of <entity>" identifies "Archdiocese" as an attribute of "New York" in the phrase "what is the Archdiocese of New York." As another example, the extract pattern "the <attribute> of <entity>" identifies "Commonwealth" as an attribute of "Virginia" in the phrase "the Commonwealth of Virginia." As yet another example, the extract pattern "<entity's> <attribute>" identifies "Rome" as an attribute of "Texas" in the phrase "Texas' Rome." In these cases, the entity attributes are part of proper names (i.e., "The Battle of Midway," "The Archdiocese of New York," "The Commonwealth of Virginia," and "Rome, Texas," respectively).

Proper name attributes can be identified in a number of ways. For example, the case of an attribute in a search query can be used to identify proper name attributes. However, with many search queries failing to include proper capitalization, this approach can be problematic.

As another example, proper name attributes can be identified by recovering case information from a more reliable source. For example, dictionaries, encyclopedia, or the Internet can be scanned to recover case information for attributes. The case information can be used to identify proper name attributes. In some implementations, the Internet can be scanned and a heuristic rule used to identify proper name attributes. For example, if an attribute is capitalized more than 50% of the time in a certain pattern, then the attribute can be identified as a proper name attribute in that pattern.

Proper name attributes can be discarded, e.g., by deleting them from memory or otherwise omitting them from further processing of attributes. The system performing process 800 identifies and discards generic attributes (810). Generic attributes are attributes that are properties, features, or characteristics of so many different entities that they do little to characterize different entities. For example, the extract pattern "the <attribute> of <entity>" identifies "middle" as an attribute of "France," "Atlanta," "summer," "life," and "nowhere" in the phrases "the middle of France," "the middle of Atlanta," "the middle of summer," "the middle of life," and "the middle of nowhere." As another example, the extract pattern "the <attribute> of <entity>" identifies "meaning" as an attribute of "life," "food," "this," "privatization," and "freedom" in the phrases "the meaning of life," "the meaning of food," "the meaning of this," "the meaning of privatization," and "the meaning of freedom." Other generic entity attributes include "picture," "story," "summary," "beginning," "end," "top," "bottom," and the like.

Generic attributes can be identified based on the number of different entities with which they are to be associated. For example, a heuristic rule (such as, e.g., an entity attribute that is to be associated with more than 30% of the desirable entities) can be used to identify generic attributes. Generic attributes can be discarded, e.g., by deleting them from memory or otherwise omitting them from further processing of attributes.

The system performing process 800 identifies and combines the number counts of semantically-related attributes (815). Semantically-related attributes are attributes that are to be associated with a single entity but characterize the same or a similar property, feature, or characteristic of that entity. For example, the attributes "czar" and "tsar" can characterize the same property, feature, or characteristic of an entity, as can the attributes "colour" and "color." Attributes that are misspellings or abbreviations are other examples of semantically-related attributes. For example, the "prezident" of Brazil is semantically-related to the "president" of Brazil and the "pres." of Brazil. Semantically-related attributes can be identified using, e.g., a thesaurus, heuristics based on the edit distance between attributes, and/or heuristics based on shared head words of attributes.

A number count of an attribute embodies the frequency of the attribute's use in characterizing an entity. For example, a number count can be a uniformly-incremented tally of the number of times that an attribute is inferred from different queries in association with an entity. As another example, each inference of an attribute in association with an entity can be weighted, e.g., based on the search query from which the attribute is inferred. The weights can be summed to embody the frequency of the attribute's use. As discussed further below, such number counts can be used to score and/or rank the attributes of an entity.

Figure 9:
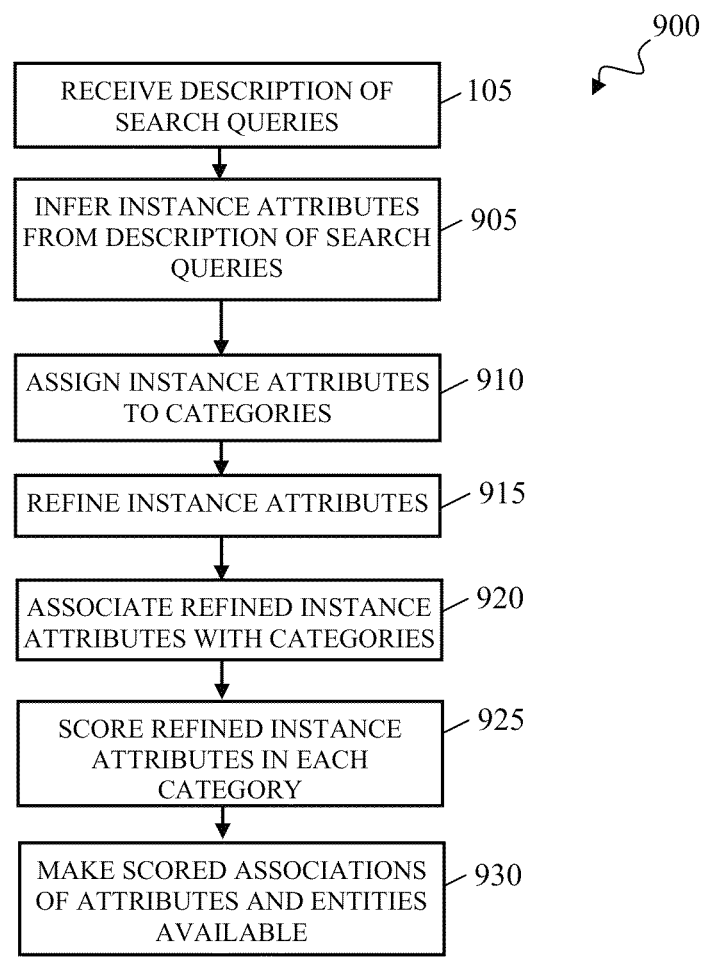

FIG. 9 is a flowchart of a process 900 for inferring attributes of a type of entity, namely, categories of instances, from search queries. Process 900 can be performed by a system of one or more data processing devices performing operations in accordance with the logic of a set of machine-readable instructions.

In addition to receiving a description of search queries (105), the system performing process 900 infers instance attributes from the description of the search queries (905). An instance is an entity that falls within a category. Instances within a category share common attributes that define that category. For example, the instances "France," "England," and "Sweden" all fall within the category "countries." As another example, the instances "countries," "states," and "counties" all fall within the category "administrative units." Thus, an entity can be an instance in one context and a category in another context. Instance attributes can be inferred, e.g., by parsing language or other text in search queries using extract patterns 305, 310, 315, 320, 325 (FIG. 3).

The system performing process 600 assigns the instance attributes to one or more categories into which the instance falls (910). The assignments can be based on the presence of an instance characterized by that attribute in a category. In some implementations, the presence of an instance in a category can be determined by comparing the attributes of different instances and grouping the instances with similar or identical attributes into a category. In this manner, categories can be defined based on the entities and attributes inferred from search queries.

Figure 10:
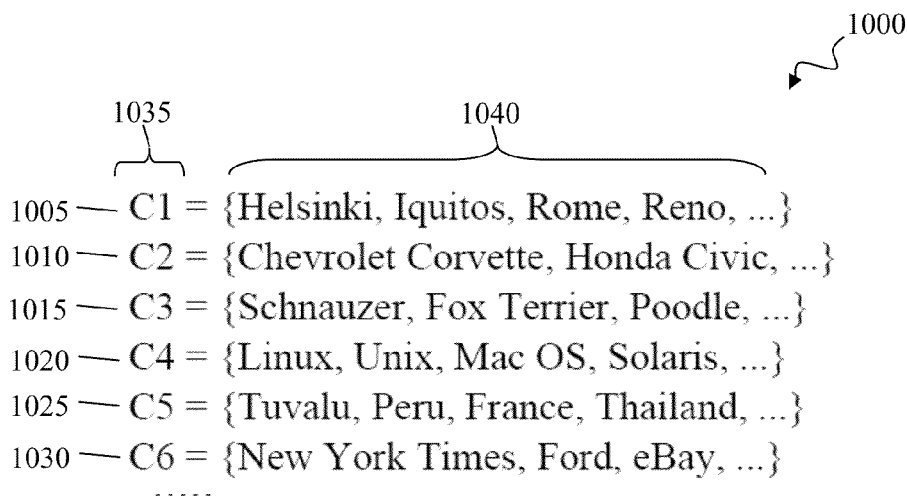
FIG. 10 shows a collection of predefined category definitions.

In other implementations, the presence of an instance in a category can be predefined. FIG. 10 shows a collection 1000 of example category definitions 1005, 1010, 1015, 1020, 1025, 1030 that are predefined, e.g., by a human user. Each definition 1005, 1010, 1015, 1020, 1025, 1030 includes an identifier of a category (such as the identifiers "C1," "C2," "C3," "C4," "C5," "C6" in column 1035) and identifiers of instances within that category (shown in lists 1040).

In operation, after a system infers an instance attribute from a description of search queries, the system can compare the instance characterized by that attribute with the instances identified in lists 1040 of collection 1000. When one or more matches are found, the system can assign the instance attribute to the categories defined in definitions 1005, 1010, 1015, 1020, 1025, 1030.

Figure 11:
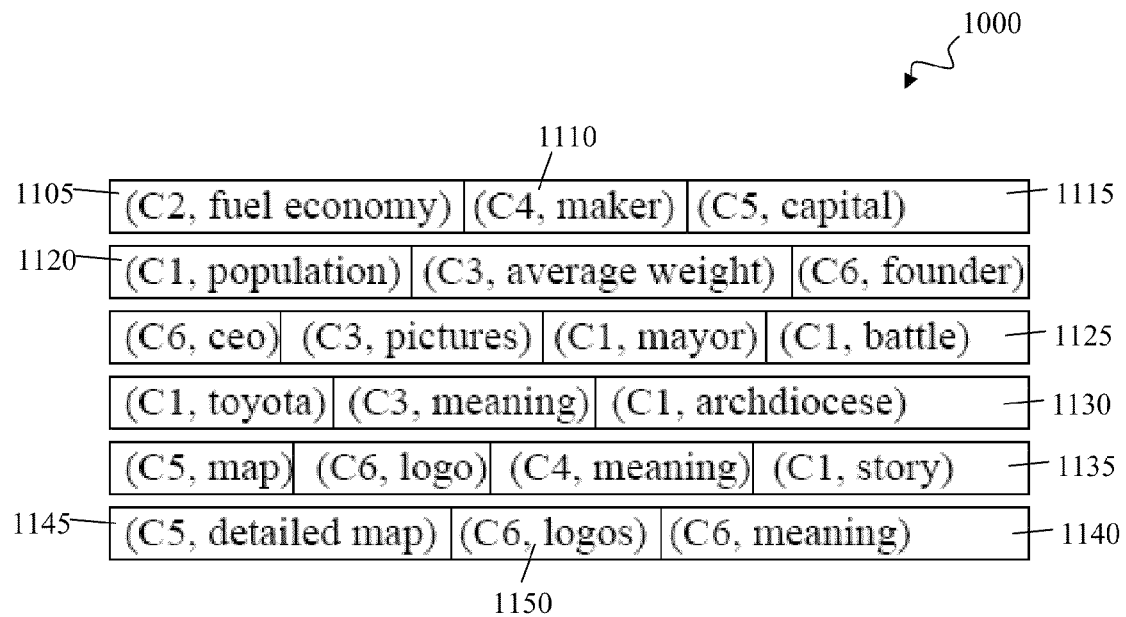
FIG. 11 is a schematic representation of a collection of assignments of instance attributes to categories.

FIG. 11 is a schematic representation of a collection 1100 of assignments of instance attributes to categories. In particular, collection 1100 represents assignments of the attributes inferred from search query log 200 (FIG. 2) to the categories defined in category definition collection 1000.

As shown, collection 1100 includes a series of category/attribute pairs 1105, 1110, 1115, 1120, 1125, 1130, 1135, 1140, 1145, 1150 . . . , which are denoted as (category identifier, attribute). For example, category/attribute pair 1105 embodies the assignment of the attribute "fuel economy" to category C2. Category C2 is defined in definition 1010 (FIG. 10) as including the instance "Honda Civic." The attribute "fuel economy" was inferred from the query described in string of text 205 in query log 200 (FIG. 2) as characterizing the instance "Honda Civic." As another example, category/attribute pair 1110 embodies the assignment of the attribute "maker" to category C4. Category C4 is defined in definition 1020 (FIG. 10) as including the instance "Solaris." The attribute "maker" was inferred from the query described in string of text 210 in query log 200 (FIG. 2) as characterizing the instance "Solaris."

Returning to FIG. 9, the system performing process 900 refines the instance attributes (915). Refining the instance attributes can generally reduce the number of instance attributes assigned to each category by, e.g., eliminating undesirable attributes and/or merging related attributes. For example, the system performing process 900 can discard instance attributes that are to be associated with undesirable instances, such as those not found in a predefined category, using process 700 (FIG. 7). As another example, the system performing process 900 can identify and discard proper name attributes and generic attributes, or identify and combine semantically-related attributes, using process 800 (FIG. 8).

Figure 12:
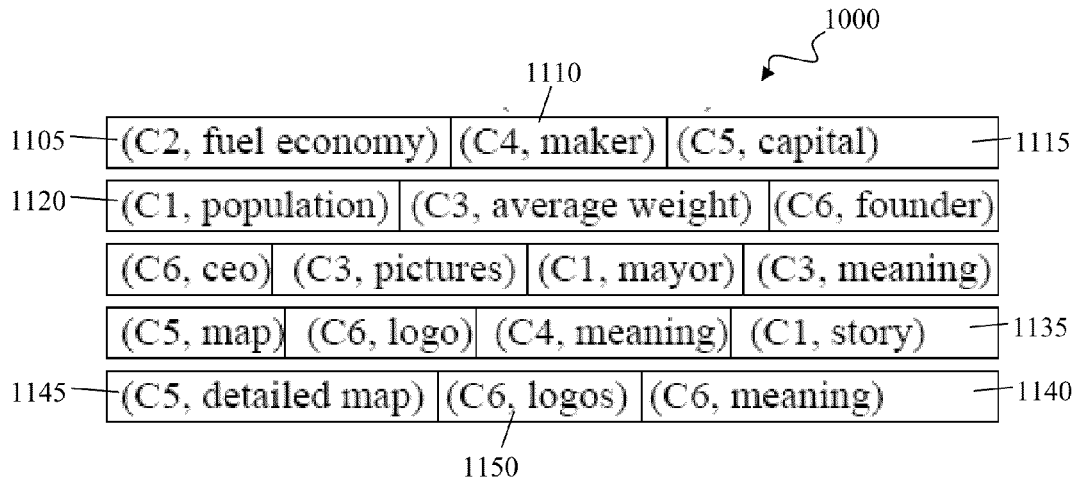
FIG. 12 is a schematic representation of the collection of FIG. 11 after refining by identifying and discarding proper name attributes.

FIG. 12 is a schematic representation of assignment collection 1100 after refining by identifying and discarding proper name attributes. In particular, category/attribute pairs 1125, 1130 (along with other category/attribute pairs) have been discarded as proper name attributes and hence removed from collection 1100.

Figure 13:
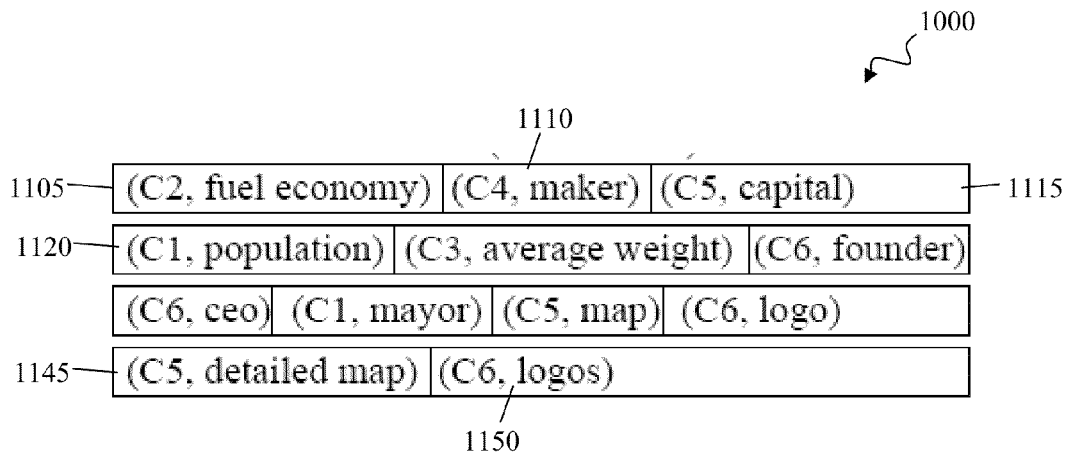
FIG. 13 is a schematic representation of the collection of FIG. 12 after refining by identifying and discarding generic attributes.

FIG. 13 is another schematic representation of assignment collection 1100 after refining by identifying and discarding generic attributes. In particular, category/attribute pairs 1135, 1140 (along with other category/attribute pairs) have been discarded as generic attributes and hence removed from collection 1100.

Figure 14:
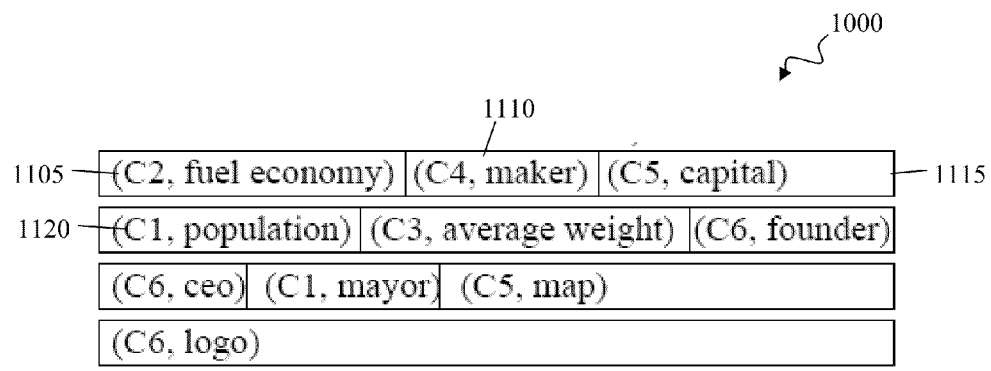
FIG. 14 is a schematic representation of the collection of FIG. 13 after refining by identifying and combining semantically-related attributes.

FIG. 14 is a schematic representation of assignment collection 1100 after refining by identifying and combining semantically-related attributes. In particular, category/attribute pairs 1145, 1150 have been discarded as semantically-related to other attributes and hence removed from collection 1100.

Returning to FIG. 9, the system performing process 900 associates the refined entity attributes with categories (920). Such associations can be embodied in a representation of the categories in the logic of a set of data processing activities.

Figure 15:
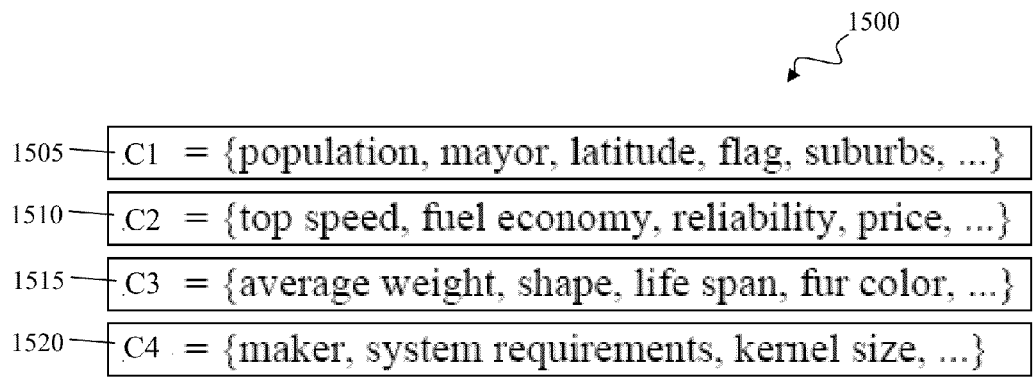
FIG. 15 is a representation of a collection of associations of refined instance attributes with categories.

FIG. 15 is a representation of a collection 1500 of associations 1505, 1510, 1515, 1520 of refined instance attributes with categories C1, C2, C3, C4. The associations can be embodied in a representation of the categories (such as a representation of a data object class) and/or a data structure (such as a data structure 500 (FIG. 5)).

Returning to FIG. 9, the system performing process 900 scores the instance attributes associated with each category (925). Such scorings can be based on the extent to which an instance attribute is relevant to characterizing the category. The scorings can be used to rank the instance attributes, and the rankings can be embodied in a representation of the entities in the logic of a set of data processing activities, e.g., by the order in which instance attributes are listed in a data structure.

The instance attributes associated with each category can be scored in a variety of different ways. For example, the instance attributes can be scored based on a number count that embodies the frequency that the instance attributes appear in the description of search queries.

In some implementations, an inference of an instance attribute can be weighted based on the extract pattern used to identify the instance attribute from a description of search queries. The weighting can reflect the nature of the extract pattern. For example, whole sentence, natural language extract patterns (e.g., "What is the capital of Brazil?") can be weighted more heavily than other extract patterns (e.g., "Brazil's capital"). The weighting can be used to calculate a number count that embodies both the rate that the instance attribute appears in a description of search queries and the nature of the search queries in which the instance attribute appears. Instance attributes can be scored based on such number counts.

In some implementations, an inference of an instance attribute can be weighted using the score Score (C, A) calculated using Equation 1, where $W_f(C, A)$ is the weighted frequency of the attribute A in the category C, N is the total frequency over all pairs, $S_f(C, A)$ is a smoothing factor that avoids over-emphasis of rare attributes, $W_f(C)$ is the weighted frequency of the category C, and $W_f(A)$ is the weighted frequency of the attribute A in all categories.

$$\text{Score}(C, A) = W_f(C, A) \times S_f(C, A) \times \log \frac{W_f(C, A) \times N}{W_f(C) \times W_f(A)} \quad \text{Equation 1}$$

The system performing process 900 can make the scored associations of instance attributes and entities available (930). The associations can be made available to a human user and/or to one or more sets of data processing activities performed in accordance with the logic of machine-readable instructions. For example, the associations of entity attributes and entities can be made available to a search engine for augmenting search results and/or for identifying keyword-based queries that request factual information.

In one implementation, a random sample of around 50 million unique search queries was assembled from query logs collected by the GOOGLE search engine in the first few months of 2006. The queries were all in English and were accompanied by a description of their frequency of submission within the logs.

A test set of five categories, namely "drug," "company," "painter," "city," and "country," were initially targeted. Each of these classes was defined as a set of representative instances, as shown in Table 1.

Each of the first 100 attributes associated with each category was manually assigned a correctness label to reflect the precision of associating the attribute with the category. Attributes labeled "vital" were thought to be indispensable from a list of attributes of a target category. Attributes labeled "okay" were thought to provide useful, if non-essential, information characterizing a target category. Attributes labeled "wrong" were thought not to be useful in

TABLE 1

| CLASS | SIZE | EXAMPLE INSTANCES |
|---|---|---|
| Drug | 346 | Ibuprofen, Tobradex, Prilosec |
| Company | 738 | Ford, Xerox, Longs Drug Stores |
| Painter | 1011 | Georgia O'Keefe, Ossip Zadkine |
| City | 591 | Hyderabad, Albuquerque, Tokyo |
| Country | 265 | Yemen, India, Paraguay, Egypt | characterizing a target category. These labels, and a numeric value that reflects the precision of the attributes, are presented in Table 2.

TABLE 2

| LABEL | VALUE | EXAMPLE ATTRIBUTES |
|---|---|---|
| Vital | 1.0 | (country, president), (drug, cost) |
| Okay | 0.5 | (city, restaurant), (company, strengths) |
| Wrong | 0 | (painter, diary), (drug, users) |

Using these numeric values, the precision at a "rank n" in a given list of attributes is the sum of the assigned values for the first number n attributes divided by the number n itself. Table 3 provides examples of the precision at various ranks

TABLE 3

| | PRECISION AT RANK | | | | |
|---|---|---|---|---|---|
| CATEGORY | 10 | 20 | 30 | 40 | 50 |
| Drug | 0.90 | 0.93 | 0.90 | 0.89 | 0.82 |
| Company | 0.90 | 0.93 | 0.83 | 0.79 | 0.79 |
| Painter | 0.95 | 0.93 | 0.85 | 0.84 | 0.75 |
| City | 0.85 | 0.73 | 0.72 | 0.66 | 0.65 |
| Country | 0.95 | 0.93 | 0.90 | 0.89 | 0.82 |

Figure 16:
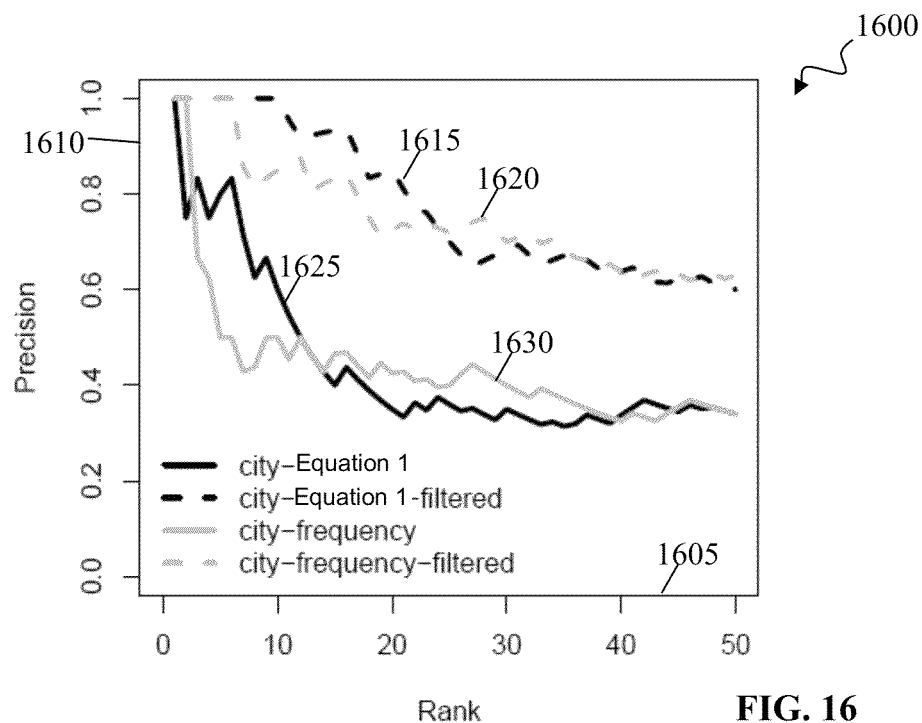
FIG. 16 is a graph that illustrates the precision of attributes inferred from search queries and associated with the category "city."

FIG. 16 is a graph 1600 that illustrates the precision of attributes inferred from search queries and associated with the category "city." Graph 1600 includes an X-axis 1605, a Y-axis 1610, and a number of traces 1615, 1620, 1625, 1630. Position along X-axis 1605 reflects the scoring of the attribute the collection of attributes associated with the category "city." Position along Y-axis 1610 embodies the precision of the attribute, calculated as the sum of the assigned values for the first number n attributes divided by the number n itself.

Four distinct lists of attributes were evaluated for the category "city," corresponding to the use of two different approaches to scoring the instance attributes and two different approaches to refining the attributes after inferring. In particular, the instance attributes were scored based on a weighting 1) calculated by summing the products of the frequency of the attribute and a factor embodying the strength of the extract pattern used to infer the attribute or 2) calculated using Equation 1. As for refining, the inferred attributes were refined 1) using process 700 (FIG. 2) or 2) using both process 700 (FIG. 2) and process 800 (FIG. 8).

Thus, trace 1615 shows the precision of attributes as a function of rank for attributes scored based on a weighting calculated using Equation 1 and refined using both process 700 (FIG. 2) and process 800 (FIG. 8). Trace 1620 shows the precision of attributes as a function of rank for attributes scored based on a weighting calculated by summing the products of the frequency of the attribute and a factor embodying the strength of the extract pattern and refined using both process 700 (FIG. 2) and process 800 (FIG. 8). Trace 1625 shows the precision of attributes as a function of rank for attributes scored based on a weighting calculated using Equation 1 and refined using process 700 (FIG. 2). Trace 1630 shows the precision of attributes as a function of rank for attributes scored based on a weighting calculated by summing the products of the frequency of the attribute and a factor embodying the strength of the extract pattern and refined using process 700 (FIG. 2). As can be seen, filtering has a stronger impact on precision than the approach used to calculate the weighting.

Figure 17:
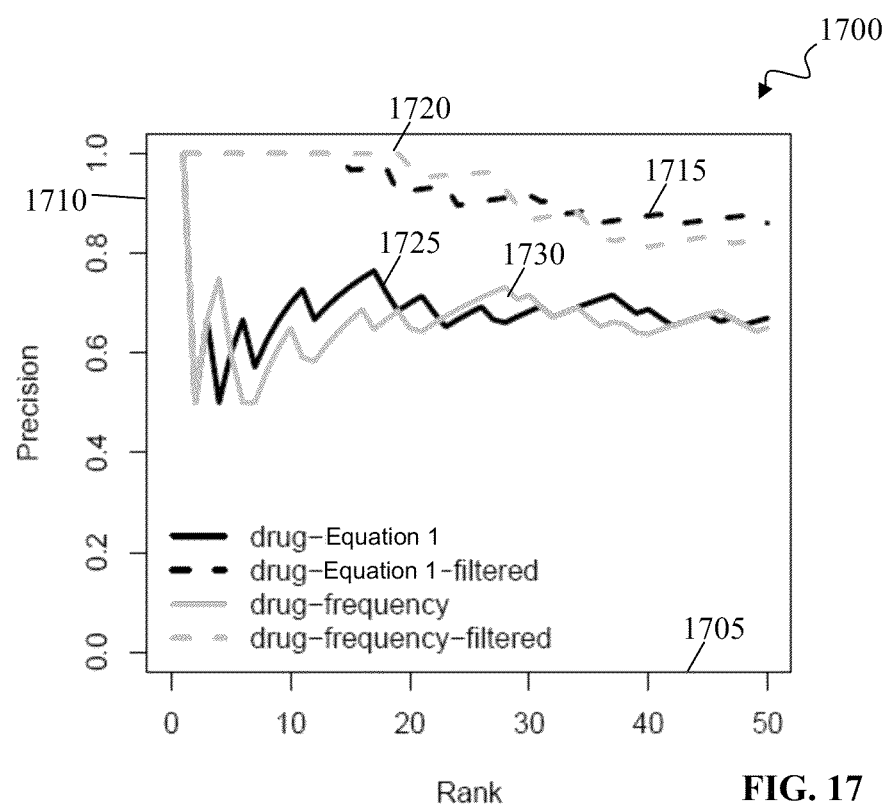
FIG. 17 is a graph that illustrates the precision of attributes inferred from search queries and associated with the category "drug."

FIG. 17 is a graph 1700 that illustrates the precision of attributes inferred from search queries and associated with the category "drug." Graph 1700 includes an X-axis 1705, a Y-axis 1710, and a number of traces 1715, 1720, 1725, 1730. Position along X-axis 1705 embodies the ranking of the attribute the collection of attributes associated with the category "drug." Position along Y-axis 1710 embodies the precision of the attribute, calculated as the sum of the assigned values for the first number n attributes divided by the number n itself.

Four distinct lists of attributes were evaluated for the category "drug," corresponding to the use of two different approaches to scoring the instance attributes and two different approaches to refining the attributes after inferring. In particular, trace 1715 shows the precision of attributes as a function of rank for attributes scored based on a weighting calculated using Equation 1 and refined using both process 700 (FIG. 2) and process 800 (FIG. 8). Trace 1720 shows the precision of attributes as a function of rank for attributes scored based on a weighting calculated by summing the products of the frequency of the attribute and a factor embodying the strength of the extract pattern and refined using both process 700 (FIG. 2) and process 800 (FIG. 8). Trace 1725 shows the precision of attributes as a function of rank for attributes scored based on a weighting calculated using Equation 1 and refined using process 700 (FIG. 2). Trace 1730 shows the precision of attributes as a function of rank for attributes scored based on a weighting calculated by summing the products of the frequency of the attribute and a factor embodying the strength of the extract pattern and refined using process 700 (FIG. 2). As can be seen, filtering has a stronger impact on precision than the approach used to calculate the weighting.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made. For example, process steps can be omitted and/or performed in different order and yet meaningful results achieved. For example, the identification and discard of generic attributes in process 800 (FIG. 8) can be omitted but the precision of a collection of entity attributes nevertheless improved. Accordingly, other implementations are within the scope of the following claims.

What is claimed is:

1. A computer-implemented method comprising:
    maintaining a collection of extract patterns, wherein each extract pattern specifies a text pattern that includes an entity placeholder and an attribute placeholder;
    maintaining a collection of category definitions, wherein each category definition comprises a category identifier, one or more entity identifiers, and one or more attribute identifiers, each entity identifier comprises an entity-name text string representing a name of an entity in the category, and each attribute identifier comprises an attribute-name text string representing an attribute of the entities in the category;
    determining that a first search query text string matches a first extract pattern in the collection of extract patterns, including:
        determining that a first substring of the first search query text string matches an entity placeholder in the first extract pattern; and
        determining that a second substring of the first search query text string matches an attribute placeholder in the first extract pattern; and
    determining that the first substring matches an entity identifier in a first category definition in the collection of category definitions;
    adding the second substring as an attribute identifier to a set of one or more first attribute identifiers in the first category definition, the set of one or more first attribute identifiers comprising at least one of the one or more attribute identifiers; and
    generating a score for a particular attribute identifier included in the set of one or more first attribute identifiers in the first category definition, wherein the score reflects an extent to which the particular attribute identifier is relevant to characterizing the first category definition.

2. The method of claim 1, further comprising:
    removing from the first category definition, after adding the second substring as an attribute identifier to the set of one or more first attribute identifiers in the first category definition, any attribute identifier in the set of one or more first attribute identifiers that identifies a proper name of a person, place, or thing.

3. The method of claim 1, further comprising:
    determining that a second search query text string matches a second extract pattern in the collection of extract patterns, including:
        determining that a first substring of the second search query text string matches an entity placeholder in the second extract pattern; and
        determining that a second substring of the second search query text string matches an attribute placeholder of the second extract pattern; and
    determining that the first substring of the second search query matches an entity identifier in the first category definition;
    determining that both the second substring of the second search query text string and the second substring of the first search query text string identify a common attribute of an entity within the first category definition and identifying the second substring of the second search query text string and the second substring of the first search query text string as being semantically related to each other; and determining a weighted frequency with which the common attribute is used to characterize the entity within the first category.

4. The method of claim 1, wherein generating the score comprises:

weighting scores for attributes identified using whole sentence extract patterns more heavily than attributes identified using non-whole sentence extract patterns.

5. The method of claim 1, wherein each extract pattern includes literal text along with the entity placeholder, and the attribute placeholder.

6. The method of claim 5, wherein the entity placeholder and the attribute placeholder are each a respective text string beginning with a "<" character and ending with a ">" character.

7. A system comprising:

one or more computers; and one or more storage devices in data communication with the one or more computers and storing instructions that, when executed by the one or more computers, cause the one or more computers to perform operations comprising:

maintaining a collection of extract patterns, wherein each extract pattern specifies a text pattern that includes an entity placeholder and an attribute placeholder;

maintaining a collection of category definitions, wherein each category definition comprises a category identifier, one or more entity identifiers, and one or more attribute identifiers, each entity identifier comprises an entity-name text string representing a name of an entity in the category, and each attribute identifier comprises an attribute-name text string representing an attribute of the entities in the category;

determining that a first search query text string matches a first extract pattern in the collection of extract patterns, including:

determining that a first substring of the first search query text string matches an entity placeholder in the first extract pattern; and determining that a second substring of the first search query text string matches an attribute placeholder in the first extract pattern; and determining that the first substring matches an entity identifier in a first category definition in the collection of category definitions;

adding the second substring as an attribute identifier to a set of one or more first attribute identifiers in the first category definition, the set of one or more first attribute identifiers comprising at least one of the one or more attribute identifiers; and generating a score for a particular attribute identifier included in the set of one or more first attribute identifiers in the first category definition, wherein the score reflects an extent to which the particular attribute identifier is relevant to characterizing the first category definition.

8. The system of claim 7, wherein the operations further comprise:

removing from the first category definition, after adding the second substring as an attribute identifier to the set of one or more first attribute identifiers in the first category definition, any attribute identifier in the set of one or more first attribute identifiers that identifies a proper name of a person, place, or thing.

9. The system of claim 7, wherein the operations further comprise:

determining that a second search query text string matches a second extract pattern in the collection of extract patterns, including:

determining that a first substring of the second search query text string matches an entity placeholder in the second extract pattern; and determining that a second substring of the second search query text string matches an attribute placeholder of the second extract pattern; and determining that the first substring of the second search query matches an entity identifier in the first category definition;

determining that both the second substring of the second search query text string and the second substring of the first search query text string identify a common attribute of an entity within the first category definition and identifying the second substring of the second search query text string and the second substring of the first search query text string as being semantically related to each other; and determining a weighted frequency with which the common attribute is used to characterize the entity within the first category.

10. The system of claim 7, wherein the operations of generating the score comprise:

weighting scores for attributes identified using whole sentence extract patterns more heavily than attributes identified using non-whole sentence extract patterns.

11. The system of claim 7, wherein each extract pattern includes literal text along with the entity placeholder, and the attribute placeholder.

12. The system of claim 11, wherein the entity placeholder and the attribute placeholder are each a respective text string beginning with a "<" character and ending with a ">" character.

13. A computer program product, encoded on one or more non-transitory computer storage media, comprising instructions that, when executed by one or more computers, cause the one or more computers to perform operations comprising:

maintaining a collection of extract patterns, wherein each extract pattern specifies a text pattern that includes an entity placeholder and an attribute placeholder;

maintaining a collection of category definitions, wherein each category definition comprises a category identifier, one or more entity identifiers, and one or more attribute identifiers, each entity identifier comprises an entity-name text string representing a name of an entity in the category, and each attribute identifier comprises an attribute-name text string representing an attribute of the entities in the category;

determining that a first search query text string matches a first extract pattern in the collection of extract patterns, including:

determining that a first substring of the first search query text string matches an entity placeholder in the first extract pattern; and determining that a second substring of the first search query text string matches an attribute placeholder in the first extract pattern; and determining that the first substring matches an entity identifier in a first category definition in the collection of category definitions;

adding the second substring as an attribute identifier to a set of one or more first attribute identifiers in the first category definition, the set of one or more first attribute identifiers comprising at least one of the one or more attribute identifiers; and generating a score for a particular attribute identifier included in the set of one or more first attribute identifiers in the first category definition, wherein the score reflects an extent to which the particular attribute identifier is relevant to characterizing the first category definition.

14. The product of claim 13, wherein the operations further comprise:

removing from the first category definition, after adding the second substring as an attribute identifier to the set of one or more first attribute identifiers in the first category definition, any attribute identifier in the set of one or more first attribute identifiers that identifies a proper name of a person, place, or thing.

15. The product of claim 13, wherein the operations further comprise:

determining that a second search query text string matches a second extract pattern in the collection of extract patterns, including:

determining that a first substring of the second search query text string matches an entity placeholder in the second extract pattern; and determining that a second substring of the second search query text string matches an attribute placeholder of the second extract pattern; and determining that the first substring of the second search query matches an entity identifier in the first category definition;

determining that both the second substring of the second search query text string and the second substring of the first search query text string identify a common attribute of an entity within the first category definition and identifying the second substring of the second search query text string and the second substring of the first search query text string as being semantically related to each other; and determining a weighted frequency with which the common attribute is used to characterize the entity within the first category.

16. The product of claim 13, wherein the operations for generating the score comprise:

weighting scores for attributes identified using whole sentence extract patterns more heavily than attributes identified using non-whole sentence extract patterns.

17. The product of claim 13, wherein each extract pattern includes literal text along with the entity placeholder, and the attribute placeholder.

18. The product of claim 17, wherein the entity placeholder and the attribute placeholder are each a respective text string beginning with a "<" character and ending with a ">" character.

* * * * *